United States Patent [19]

Hempel et al.

[11] 4,339,342

[45] Jul. 13, 1982

[54] ANTI-FOAMING AGENTS, THE PREPARATION THEREOF, AND THEIR USE IN AQUEOUS SYSTEMS

[75] Inventors: Hans-Ulrich Hempel, Overath; Edmund Schmadel, Leichlingen both of Fed. Rep. of Germany

[73] Assignee: Henkel Kommanditgesellschaft auf Aktien, Düsseldorf-Holthausen, Fed. Rep. of Germany

[21] Appl. No.: 250,683

[22] Filed: Apr. 3, 1981

[30] Foreign Application Priority Data

Apr. 5, 1980 [DE] Fed. Rep. of Germany ....... 3013391

[51] Int. Cl.$^3$ .................... B01D 19/04; C11D 3/12; C11D 3/20
[52] U.S. Cl. .................... 252/174.25; 252/89.1; 252/140; 252/174.15; 252/321; 252/356
[58] Field of Search .................. 252/89.1, 140, 174.15, 252/174.25, 321, 358

[56] References Cited

U.S. PATENT DOCUMENTS

| | | | |
|---|---|---|---|
| 3,207,698 | 9/1965 | Liebling | 252/321 |
| 3,344,075 | 9/1967 | Scott | 252/321 X |
| 3,408,306 | 10/1968 | Boylan | 252/321 |
| 3,697,442 | 10/1972 | Lieberman | 252/321 |
| 4,021,365 | 5/1977 | Sinka | 252/321 |
| 4,087,398 | 5/1978 | Heyden | 252/321 X |
| 4,145,310 | 3/1979 | Simoneau | 252/321 |

*Primary Examiner*—Dennis L. Albrecht
*Attorney, Agent, or Firm*—Hammond & Littell, Weissenberger and Muserlian

[57] ABSTRACT

This invention is directed to a method for preparing foam inhibitors for aqueous systems, which comprises the steps of:

(a) mixing a higher-molecular branched-chain primary alcohol or from about 18 to 30 carbon atoms with hydrophobic colloidal silica in an alcohol to silica ratio of from about 100:2 to 100:20;

(b) heating the mixture from step (a) under stirring to temperatures of from about 100° to 240° C.; and (c) allowing the heated mixture from step (b) to cool to room temperature.

This invention is also directed to the suds regulators prepared and their use in aqueous detergent systems.

11 Claims, No Drawings

ANTI-FOAMING AGENTS, THE PREPARATION THEREOF, AND THEIR USE IN AQUEOUS SYSTEMS

FIELD OF THE INVENTION

This invention relates to a method of preparing anti-foaming agents for aqueous systems. More particularly, this invention relates to the preparation of novel silicone-free anti-foaming agents and their use as foam inhibitors in detergents and cleansers.

BACKGROUND OF THE INVENTION

The problem of regulating the suds, or foaming, in aqueous systems which tend to foam excessively when they are moved or heated, has already led to numerous suggested solutions. The control of foaming over the entire washing range of a detergent or cleanser is necessary, particularly in aqueous washing and cleaning liquors, as they are used in the modern washing treatment in washing machines, particularly drum-type washing machines, because both excessive foaming and the complete absence of suds can lead to undesired results. An excellent anti-foaming agent was found in soaps based substantially upon $C_{20}$ and $C_{22}$ fatty acids, as they are available from rape oil and fish oils as natural sources. However, for various reasons a reliable supply of these raw materials can not be ensured. Also, the required relatively high concentration in which these fatty acids must be used, which is on the order of from 2 to 3.5 percent by weight, based on the total weight of the finished detergent, is a disadvantage.

Known silicone foam inhibitors which consists of liquid polysiloxanes with alkyl or aryl substituents and finely-divided collodial silica, effect desired suds control with very small amounts of the inhibitor, substantially below 1 percent by weight, and are in this respect superior to foam-inhibiting soaps. However, the high costs of the silicone foam inhibitors and also the great number of parameters which must be observed in suds control, have led to further efforts in this field to make new silicone-free foam inhibitors available. Liquid and solid hydrocarbons or chlorinated hydrocarbons, wax-like fatty acid esters, long-chain fatty alcohols containing up to 50 carbon atoms, fatty ketones, aliphatic disulfides or sulfoxides, and the like, partly also in combination with hydrophobic, finely-divided silicon dioxide, have been suggested as foam-inhibiting active substances. For example, a special ternary foam inhibitor consisting of a liquid hydrocarbon, a solid hydrocarbon, or a fatty acid ester, as well as a hydrophobic silicon dioxide, has become known recently from the European Patent Application No. 0 000 216.

OBJECTS OF THE INVENTION

It is an object of the invention to provide novel anti-foaming agents.

It is also an object of the invention to provide low cost, silicon-free foam inhibitors which can be used in relatively small amounts.

It is a further object of the invention to provide a method of preparing such low cost, silicone-free foam inhibitors.

It is a yet further object of the invention to provide for the use of such silicone-free foam inhibitors in detergents and cleansers.

These and other objects of the invention will become more apparent in the discussion below.

DETAILED DESCRIPTION OF THE INVENTION

Applicants have developed an anti-foaming system which can be obtained from readily accessible raw materials in a certain manner and which is highly effective in low concentrations in the absence of free polysiloxanes. According to applicant's invention, foam inhibitors for aqueous systems are prepared by the steps of:

(a) mixing a higher-molecular branched-chain primary alcohol of from about 18 to 30 carbon atoms with hydrophobic colloidal silica in an alcohol to silica ratio of from about 100:2 to 100:20, preferably from about 100:3 to 100:10;

(b) heating the mixture from step (a) under stirring to temperatures of from about 100° to 240° C.; and (c) allowing the heated mixture from step (b) to cool to room temperature.

The heating under stirring is preferably effected under an inert gas atmosphere for from about 1 to 5 hours.

Alcohols which are particularly suitable for the method are the so-called Guerbet alcohols, that is, single-branched, iso-alcohols, which are technically readily obtainable by the Guerbet reaction from fatty alcohols. These Guerbet alcohols can be represented by the following general formula:

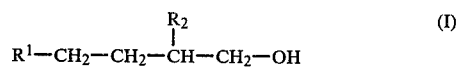

$$R^1-CH_2-CH_2-\underset{\underset{R_2}{|}}{CH}-CH_2-OH \quad (I)$$

wherein $R^1$ and $R^2$, which can be identical or different, each represent an alkyl of from 4 to 16 carbon atoms. The Guerbet alcohols should have a total of from about 18 to 30 carbon atoms. The Guerbet alcohols used according to the invention can be homogeneous compounds or mixtures and preferably are liquid at room temperature.

The products obtained according to the process described above are highly effective foam inhibitors. They reduce sudsing over the entire washing cycle in amounts as small as from about 0.01 to 1 percent by weight, preferably from about 0.05 to 0.2 percent by weight, based on the total weight of the detergent, in a modern detergent suitable for washing machines, which detergent generally contains from about 5 to 30 percent by weight of a surface-active substance. The highly effective foam inhibition of the new products is surprising in view of known foaming bath additives, such as, for example, those disclosed in German Published Application (DOS) No. 19 48 500, which contain from 5 to 50 percent of the Guerbet alcohol 2-octyldodecanol ($R^1=R^2=$octyl in Formula I), in addition to the highly sudsing wash-active substances that are customary for both additives.

The method according to the invention is simple to carry out and requires no special apparatus. However, it is advantageous, though not absolutely necessary, to homogenize the mixture of alcohol and silica before heating. Ordinary homogenization apparatuses, such as a high-speed stirrer provided with a toothed disk, are sufficient. Heating of the mixtures is absolutely necessary and is thus a substantial part of the method according to the invention. Without heating, the mixtures prepared have no satisfactory foam inhibiting effect.

The preparation of the single-branched iso-alcohols to be used according to the invention is known. Preparation of the Guerbet alcohols is described, for example, in German Published Application (DOS) No. 26 34 676. General information on the Guerbet reaction can be found in, for example, in F. Asinger, Chemie und Technologie der Monoolefine, 1957, pages 547–548, and the bibliography cited therein.

It is particularly advantageous to use as Guerbet alcohol starting material the so-called light ends of the fatty alcohols obtained in the commercial preparation of the natural fats, which alcohols are unsuitable for direct processing to prepare surfactants useful in the detergent industry. These are fatty alcohols obtained by hydrogenation of fatty acids with less than 12 carbon atoms, such as the compounds hexanol, octanol, and decanol. The products according to the invention have thus the advantage that they can be readily obtained from relatively cheap raw materials that are undesired by-products in the production of wash-active substances.

The highly effective foam inhibitors can also be obtained from fatty alcohols with 12 and more carbon atoms, which represent the most important raw materials for the production of wash-active substances, via the Guerbet reaction and the further processing according to the invention. However, their effectiveness is not greater than that of the so-called light ends of the fatty alcohols, so that there is no technical need to only use these long-chain fatty alcohols as raw materials. Preferred raw materials of the Guerbet alcohols are thus the chemically homogeneous compounds or mixtures where $R^1$ and $R^2$ in Formula I are alkyls of from $C_6$ to $C_{10}$, with emphasis on the frequency distribution at $C_8$, that is, with decanol as a starting substance.

Suitable silicas include all hydrophobic silicas with a specific surface area of at least about 50 $m^2/gm$. In general, the value of the specific surface area is from about 100 to 300 $m^2/gm$. These silicas consist of microfine silicon dioxide with an average primary particle size of about 5 m$\mu$ to about 50 m$\mu$, as determined by the evaluation of electron-optical photography with particles of individual sizes in the range of from about 3 m$\mu$ to 150 m$\mu$. Such finely-divided silicas are obtained by flame hydrolysis or by precipitation. Making the silicas hydrophobic is usually effected by treatment with alkyl chlorosilanes, for example, dimethyldichlorosilane, trimethylchlorosilane, or cyclic or linear polydimethylsiloxanes.

The amount of siloxanes or silanes required to make the silicas hydrophobic is on the order of from about 4 to 6 percent by weight, based on the weight of the silica. Based on the total weight of the products according to the invention, the amount of siloxane or silane is thus only from about 0.1 to 0.6 percent by weight, so the products according to the invention can justifiably be considered silicone-free.

The products according to the invention are highly suitable for use as foam inhibitors for aqueous systems in any field of application, such as in the paper industry, oil drilling, sugar refining, textile industry, sewage treatment, cutting oil emulsions, for distillation, and flotation methods, as well as particularly when washing or cleaning liquors are moved or heated. The products according to the invention are alkaline-stable and are not inactivated by aqueous alkali and surfactant solutions. They are therefore ideally suitable for incorporation into powdered and liquid detergents and cleansers according to known methods generally used in the manufacture of liquid and powdered detergents and cleansers.

A particularly preferred embodiment is incorporation into powdered detergents and cleansers by means of a powdered premix, where the products according to the invention are mixed with either a separate powdered additive, such as sodium perborate, or a granulated or spray-dried powder from the builder substances of the detergents as a solid substrate. Direct incorporation into a detergent batch to be processed by spray drying is also possible, although larger amounts are required in this instance because of the partial loss of effectiveness of the foam inhibitors due to spray drying. in addition to direct mixing with the detergent slurry, it is also possible to add the foam inhibitors to the finished detergent slurry just before the spraying stations.

Another aspect of the invention is the use of the products according to the invention as foam inhibitors in detergents and cleansers. Of particular interest are those detergents and cleansers which are used in closed washing machines and dishwashers with highly mechanical treatment of the materials to be cleaned. As mentioned above, additions of from about 0.01 to 1, preferably from about 0.05 to 0.2, percent by weight of the products prepared according to the invention to the detergents or cleansers is sufficient to control the formation of suds. The products according to the invention are thus comparable in their concentration to the most effective commercially available silicone-preparations. Detergents and cleansers which contain the foam inhibitor according to the invention can also contain anionic, non-ionic, hybrid-anionic, and, if necessary, also cationic surfactants with strong foaming action, as well as water-soluble or water-insoluble builder substances, alkalies, and other additives which improve the washing and cleaning results or the application properties of the cleaned material.

The following examples are intended to illustrate the invention and should not be construed as limiting the invention thereto.

EXAMPLES

Example 1

One hundred grams of 2-octyldodecanol ($R^1 = R^2 = C_8H_{17}$ in the compound of Formula I), commercially available as Eutanol G ® from Dehydag [index of refraction (20° C.): 1.454–1.456], and 3.5 gm of a pyrogenic silica, made hydrophobic with dimethyldichlorosilane, with a BET-surface of 120 $m^2/gm$ and a mean primary particle size of 16 m$\mu$ (Aerosil R ® 972, available from Degussa), were homogenized at 900 to 1000 rpm with a Pendraulik agitator (Pendraulik, Bad Münder, Fed. Republic of Germany) which was equipped with a toothed disk having a 50 mm diameter. Then, the mixture was heated with stirring in a nitrogen atmosphere for 5 hours at 240° C. The product obtained had a viscosity of 126 mPa.s at 20° C.

Examples 2 and 3

In Example 2, a product was obtained using a procedure similar to that of Example 1, with the exception that the mixture was heated only to 100° C. The viscosity fo the product was 153 mPa.s (20° C.).

Example 3 was conducted similarly to Example 1, a difference being that the mixture of starting materials was homogenized but not subsequently heated. The viscosity of the product was 142 mPa.s (20° C.).

Example 4

The procedure of Example 1 was followed, with the exception that the mixture was not homogenized but was only heated to 240° C. for 5 hours under stirring at about 400 rpm with a conventional teflon paddle agitator in a nitrogen atmosphere. The product obtained had a viscosity (20° C.) of 142 mPa.s.

Examples 5 and 6

Example 1 was repeated, except that instead of 3.5 gm of the silica described in Example 1 being used, 5.0 gm and 8.0 gm, respectively, were used. The viscosities of the products prepared according to Examples 5 and 6 were 155 mPa.s and 579 mPa.s, respectively, at 20° C.

Examples 7 and 8

One hundred grams of 2-octyldecanol were mixed with a precipitated silica made hydrophobic with organochlorosilanes (BET-surface 110 $m^2$/gm, mean primary particle size 28/m$\mu$, commercially available under the tradename Sipernat D 17 from Degussa), and treated as in Example 1. Amounts of 3.5 and 8.0 gm of precipitated silica were used in Examples 7 and 8, respectively. The viscosities of the products at 20° C. were 71 mPa.s and 93 mPa.s, respectively.

Example 9

From a commercial $C_{10}/C_{16}$ fatty alcohol a mixture of various Guerbet alcohols was prepared according to the method described in German Published Application (DOS) No. 26 34 676, incorporated herein by reference. The Guerbet alcohol prepared comprised a mixture having the following composition:

| | |
|---|---|
| $C_{22}H_{45}OH$ | 3% weight |
| $C_{24}H_{49}OH$ | 44.7% weight |
| $C_{26}H_{53}OH$ | 25.3% weight |
| $C_{28}H_{57}OH$ | 13.1% weight |
| $C_{30}H_{61}OH$ | 2.4% weight |

One hundred grams of this mixture were mixed with 3.5 gm of the silica described in Example 1 and processed as described in Example 1. The resulting product had a viscosity of 160 mPa.s at 20° C.

The following Examples 10 to 13 were prepared for the purpose of comparison.

Example 10

This sample comprised the product SAG® 100, a silicone-based foam inhibitor available form Union Carbide.

Example 11

One hundred grams of 2-octyldecanol and 3.5 gm of a nonhydrophobic pyrogenic silica (BET-surface 200 $m^2$/gm, mean primary particle size 12 m$\mu$, available under the tradename Aerosil® 200 from Degussa), were treated as in Example 1. The viscosity of the product was 135 mPa.s at 20° C.

Example 12

One hundred grams of a technical oleyl alcohol, iodine number 94, hydroxyl number 210, were mixed with hydropobic silica and treated as described in Example 1. The resulting product had a viscosity of 140 mPa.s at 20° C.

Example 13

A quantity of 2-octyldecanol was heated under stirring for 5 hours in a nitrogen atmospete at 240° C. without the addition of silica. After this treatment, the product had a viscosity of 54 mPa.s at 20° C.

Example 14

To demonstrate foam inhibiting effect, the products of Examples 1 to 13 were used with a test detergent. In addition, one control run was made without any foam inhibiting additive.

The test detergent had the following composition:

| Component | Percent by Weight |
|---|---|
| n-Dodecylbenzene sulfonate-Na-salt | 7.0 |
| Tallow fatty alcohol + 14 EO | 2.5 |
| Sodium tripolyphosphate | 40.0 |
| Waterglass ($Na_2O:SiO_2$ = 1:3.35) | 3.5 |
| Sodium perborate-tetrahydrate | 24.0 |
| Magnesium silicate | 2.5 |
| Ethylenediaminetetraacetate-Na-salt | 0.2 |
| Sodium carboxymethyl cellulose | 1.0 |
| Optical brightener | 0.3 |
| Sodium sulfate and water | balance |

The concentration of foam inhibitor in the test detergent was 0.1 or 0.2, or, in the case of Example 13, 3.5 percent by weight, based on the weight of the detergent plus foam inhibitor, and the detergents were used in a normal washing cycle of up to 95° C. with soaking and clear rinsing in a drum-type washing machine (Miele W 433). The machine was loaded with 3.5 kg of clean household linen, and the water hardness was only 3° dH, that is, conditions which favored considerable sudsing were selected. The amount of detergent was 100 gm each for soaking and clear rinsing.

To determine the foaming behavior, the height of the suds was checked through the sight glass of the front door of the washing machine and graded according to the following scale:

| | |
|---|---|
| no suds | 0 |
| ¼ height of sight glass | 1 |
| ½ height of sight glass | 2 |
| ¾ height of sight glass | 3 |
| 4/4 height of sight glass | 4 |
| suds in the filler inlet | 5 |

When the washing machine overflowed, the liquor loss was weighed.

The foaming behavior of the detergent with the indicated concentration of the foam inhibiting additives according to Examples 1 to 13 and control run for a washing temperature of 95° C. are shown in the following table:

TABLE

| Example | Amount of Suds Inhibitor (Percent by Weight) | Sudsing Grade or Liquor Loss |
|---|---|---|
| 1 | 0.1 | 1-2 |
| 2 | 0.1 | 3 |
| 3* | 0.1 | 240 gm |
| 4 | 0.1 | 3 |
| 5 | 0.2 | 1-2 |
| 6 | 0.2 | 1-2 |
| 7 | 0.2 | 1-2 |
| 8 | 0.2 | 1-2 |
| 9 | 0.2 | 2 |
| 10* | 0.1 | 2-3 |

TABLE-continued

| Example | Amount of Suds Inhibitor (Percent by Weight) | Sudsing Grade or Liquor Loss |
| --- | --- | --- |
| 11* | 0.2 | 80 gm |
| 12* | 0.2 | 340 gm |
| 13* | 3.5 | 320 gm |
| control | — | >500 gm |

*Comparison

The results with the product according to Example 3 clearly show that mere mixing of the alcohol and silica mixture without subsequent heating leads to an unusable product. The product with the unbranched, long-chain alcohol according to Example 12 was likewise unsuitable as a suds inhibitor. The testing run with the product of Example 13 shows that the Guerbet alcohol 2-octyldecanol has no anti-foaming action alone, that is, without incorporation of the hydrophobic silica according to the invention.

The comparison tests also show that excellent sudsing grades can be achieved with 0.1 or 0.2 percent by weight of the foam inhibitors produced according to the invention.

During subsequent storage of powdered detergents containing from 0.1 to 0.2 percent by weight of the foam inhibitor produced according to the invention, no loss of the foam inhibiting action was observed, even after prolonged storage. Even repeated use of the foam inhibitors according to the invention in washing textiles did not result in greying of the fabrics. Nor were deposits on washing machine parts, which deposits can appear with the use of silicone foam inhibitors, observed with the use of the foam inhibitor according to the invention.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A method for preparing foam inhibitors for aqueous systems, which comprises the steps of:
   (a) mixing a higher-molecular branched-chain primary alcohol of from about 18 to 30 carbon atoms with hydrophobic collodial silica in an alcohol to silica ratio of from about 100:2 to 100:20;
   (b) heating the mixture from step (a) under stirring to temperatures of from about 100° to 240° C.; and
   (c) allowing the heated mixture from step (b) to cool to room temperature.

2. The method of claim 1, wherein the alcohol to silica ratio in step (a) is from about 100:3 to 100:10.

3. The method of claim 1, wherein in step (b) the mixture is heated under an inert gas atmosphere for from about 1 to 5 hours.

4. The method of claim 1, wherein the primary alcohol in step (a) is a Guerbet alcohol of the formula

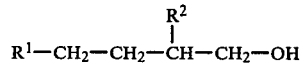

wherein $R^1$ and $R^2$, which may be the same or different, are each an alkyl of from 4 to 16 carbon atoms.

5. The method of claim 4, wherein the Guerbet alcohol is liquid at room temperature.

6. The method of claims 1 or 4, wherein the alcohol consists substantially of 2-octyldecanol.

7. The method of claim 1, wherein the mixture of alcohol and silica in step (a) is homogenized prior to heating in step (b).

8. A foam inhibitor prepared according to claim 1.

9. A method of regulating suds in aqueous detergent systems which comprises incorporating into the detergent an effective amount of a foam inhibitor of claim 8 before dilution to produce said aqueous detergent system.

10. The method of claim 9, wherein from about 0.01 to 1 percent by weight, based on the total weight of the detergent, is incorporated.

11. The method of claim 10, wherein from about 0.05 to 0.2 percent by weight, based on the total weight of the detergent, is incorporated.

* * * * *